M. TAMBURINI.
MEASURING DEVICE.
APPLICATION FILED AUG. 16, 1910.

1,021,956.

Patented Apr. 2, 1912.

Witnesses:
Floriana Abate
Giovanni Malone

Inventor:
Matthew Tamburini

UNITED STATES PATENT OFFICE.

MATTHEW TAMBURINI, OF PATERSON, NEW JERSEY.

MEASURING DEVICE.

1,021,956. Specification of Letters Patent. Patented Apr. 2, 1912.

Application filed August 16, 1910. Serial No. 577,539.

*To all whom it may concern:*

Be it known that I, MATTHEW TAMBURINI, a citizen of Italy, and at the present time a resident of the city of Paterson, county of Passaic, and State of New Jersey, have invented a new and useful Measuring Device, of which the following is a specification, reference being had to the accompanying drawings.

This invention relates to measuring devices and primarily to that class of mechanisms for measuring or determining the amount of woven material a single loom produces.

The present invention comprises a simple and durable construction which may be secured adjacent to the loom or weaving device and is provided with a horizontal cylindrically shaped drum or cylinder over which the woven fabric is adapted to pass. In so passing, the fabric rotates said cylinder, which latter through a train or series of gears of proper proportions causes a registering on a dial, which may be situated in any suitable place, of the amount of material produced by the loom.

For a full understanding of the present invention, reference is to be had to the following description and to the accompanying drawings, wherein—

Figure 1:
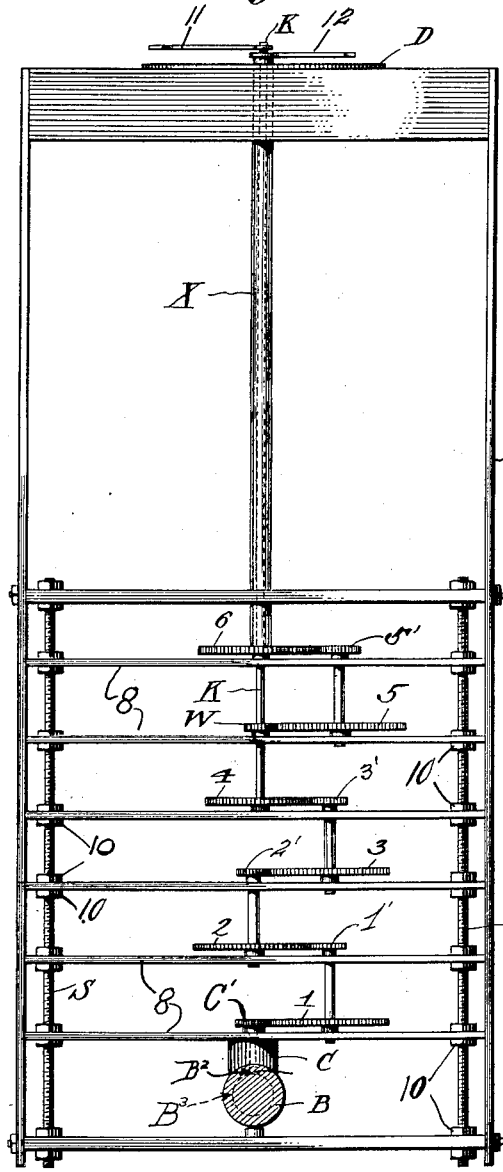
Figure 2:
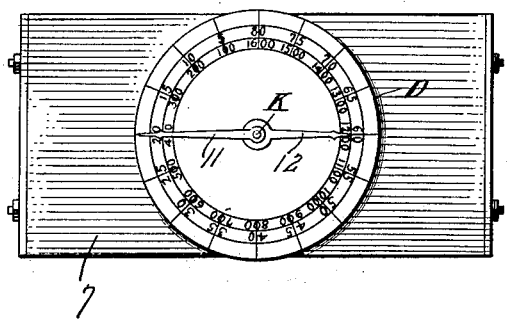
Figure 3:
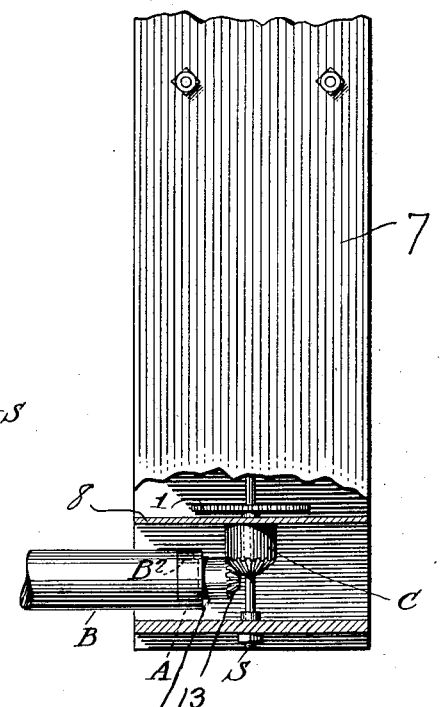

Figure 1 is a front elevation of the present invention; Fig. 2 is a top plan view thereof disclosing the mounting of the dial; and Fig. 3 is a fragmentary side elevation, parts thereof being broken away to more clearly disclose a certain portion of the gearing.

Throughout the detail description and on the several figures of the drawings, similar parts are referred to by like reference characters.

In carrying out the present invention a frame 7 is secured adjacent to the loom, the former comprising a plurality of supports or shelves 8 which are mounted on each end on a vertical threaded member S and are retained in spaced relation with each other by the adjusting nuts 10 threaded on said member S.

Each shelf or supporting member 8 is apertured to receive or form journal bearings for the counter-shafts on each terminal of which is secured a gear meshing with another gear of different diameter carried by an adjacent shaft. A centrally located shaft K protrudes through the top of the frame 7 and carries on said protruding terminal an indicator or pointer 11, said shaft receiving its rotary movement from the train of transmission gears operatively connected with the cylinder B hereinafter described.

Incasing the greater part of the shaft K is a hollow shaft X which carries on its upper terminal adjacent to the pointer 11 a similar indicating device 12, but of a different length. Mounted on the hollow shaft X adjacent to its lower bearing is a gear 6 said gear 6 meshing with a gear 5' which is carried on the same counter-shaft carrying the gear 5, the latter meshing with a gear W rigidly secured to the shaft K. Upon a complete rotation of the shaft K, the shaft X will have completed but one-fifth of a revolution and by observing the indicator 12, it may be ascertained how many revolutions the indicator 11 has completed, thus making it unnecessary to make note of every complete rotation of the shaft K.

From the foregoing, it will be observed that the shaft is rotated simultaneously with the shaft K, but at less velocity, owing to the reducing transmission gears 5 and 5'. These gears are of such proportions that, upon the shaft K making a complete rotation, the hollow shaft X and the pointer 12 will have moved in an arc of only 72°. Of course, it is not my intention to limit the present invention to the use of such gears as different ratios may be obtained between the gears whereby the rotary movement of the hollow casing X may be decreased or increased upon a complete rotation of the shaft K without departing from the scope of the invention, as claimed herewith.

The gear which is mounted on the supporting bracket 8 is secured to a depending tubular member C, having its lower terminal tapering and provided with teeth to form a beveled gear which meshes with a second beveled gear 13 formed on a terminal of the horizontal cylinder B. This operating cylinder or member B comprises a cap portion B' which has formed thereon the beveled gear 13, said cap portion B' having formed therein a recess $B^3$ and a slot $B^2$ opening into said recess. This recess $B^3$ is adapted to receive a reduced portion A formed on the main body of the cylinder, said body being prevented from an independent movement relative to the cap B′ by having the reduced portion A provided with a key adapted to fit in the slot B².

From the foregoing, it will be noted that the body portion of the cylinder B may be replaced easily and quickly, should the same wear out or become useless. Also, different sized cylinders may be secured to the same cap, if it is desired, in which case the dial D would have to be changed.

When the loom is in operation and the cylinder B is being operated upon by the woven fabric passing thereover, a rotary movement will be given the gear C′ which will impart a similar movement to the shaft K through the gears 1, 1′, 2 and 2′, the last mentioned gear meshing with and rotating the gear 3 and, as above described, causes the rotation of the shafts K and X and the registering on the dial D by the hands or indicators 11 and 12 the amount of woven material which has passed over said cylinder.

Having thus fully described my invention, what is claimed as new is:—

In an indicator, a frame comprising adjustable supporting members, indicating members mounted on said frame, an operating member comprising a cylinder having a reduced portion on one end thereof provided with a key, a cap section having a recess therein to receive the reduced portion of said cylinder including the aforesaid key thereon, a gear formed on said cap section, a second gear meshing with the first mentioned gear and mounted on one of said adjustable supporting members, and a train of gears operatively connecting said second mentioned gear to said indicating members for moving each of the latter at different speeds, said train of gears being mounted on said adjustable supporting members.

MATTHEW TAMBURINI.

Witnesses:
  Thomas Cappa,
  Jno. F. Cross.

---

Copies of this patent may be obtained for five cents each, by addressing the "Commissioner of Patents, Washington, D. C."